Figure 1:
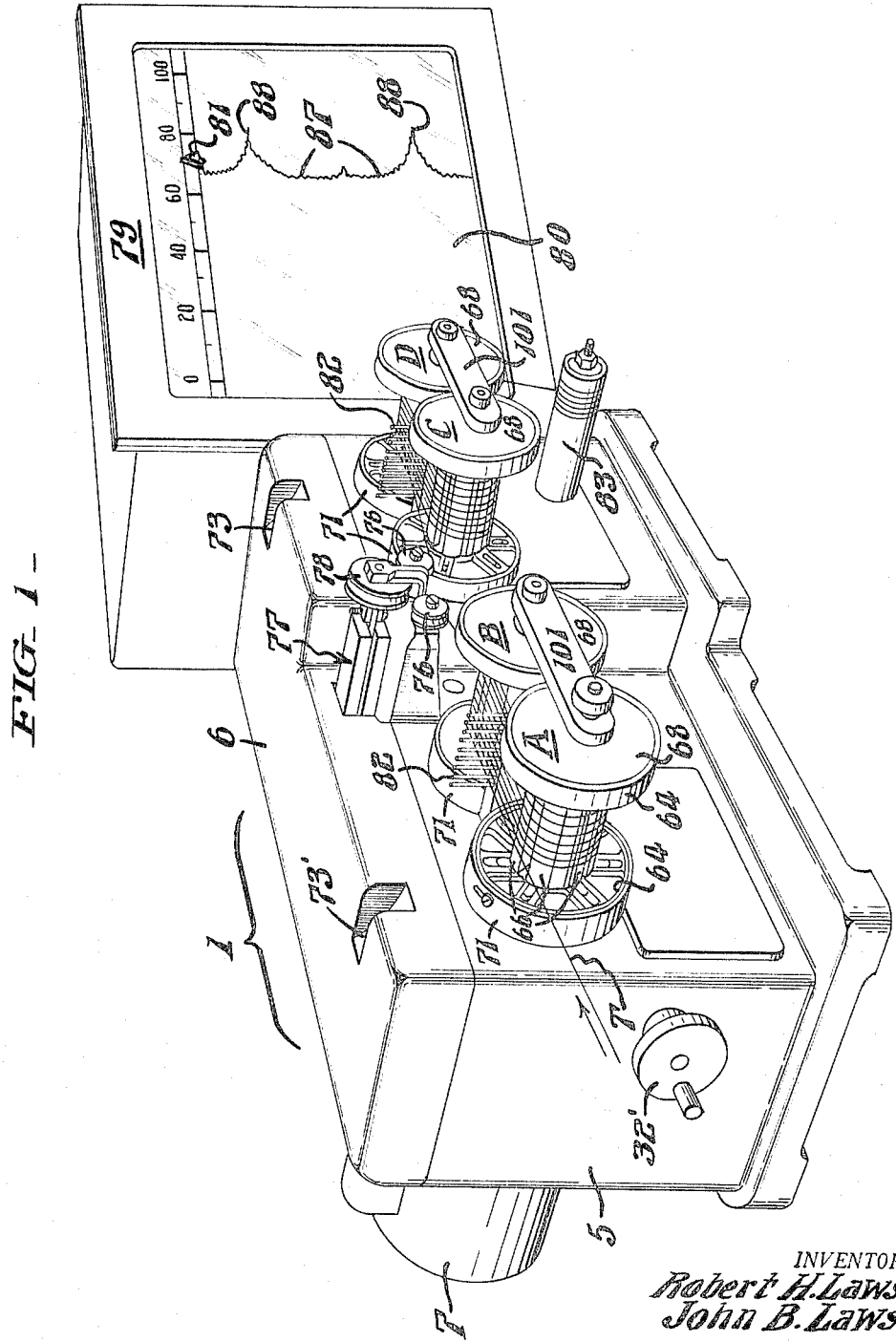

Sept. 27, 1966 R. H. LAWSON ET AL 3,274,824
METHOD AND APPARATUS FOR TENSILE TESTING
Filed May 21, 1964 9 Sheets-Sheet 3

INVENTORS.
Robert H. Lawson &
John B. Lawson,
BY Paul & Paul
ATTORNEYS.

Sept. 27, 1966 R. H. LAWSON ET AL 3,274,824
METHOD AND APPARATUS FOR TENSILE TESTING
Filed May 21, 1964 9 Sheets-Sheet 4
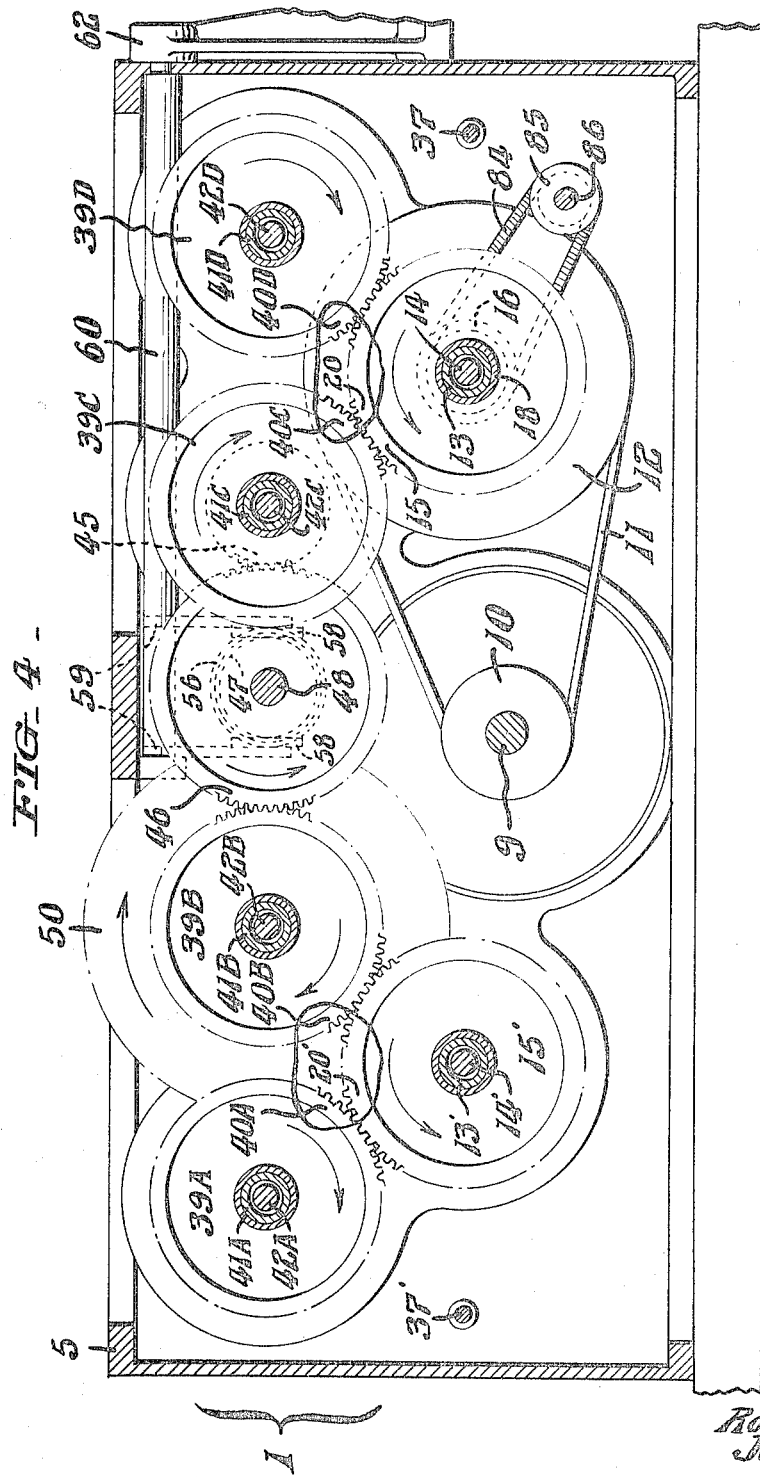
INVENTORS.
Robert H. Lawson &
John B. Lawson,
BY Paul & Paul
ATTORNEYS.

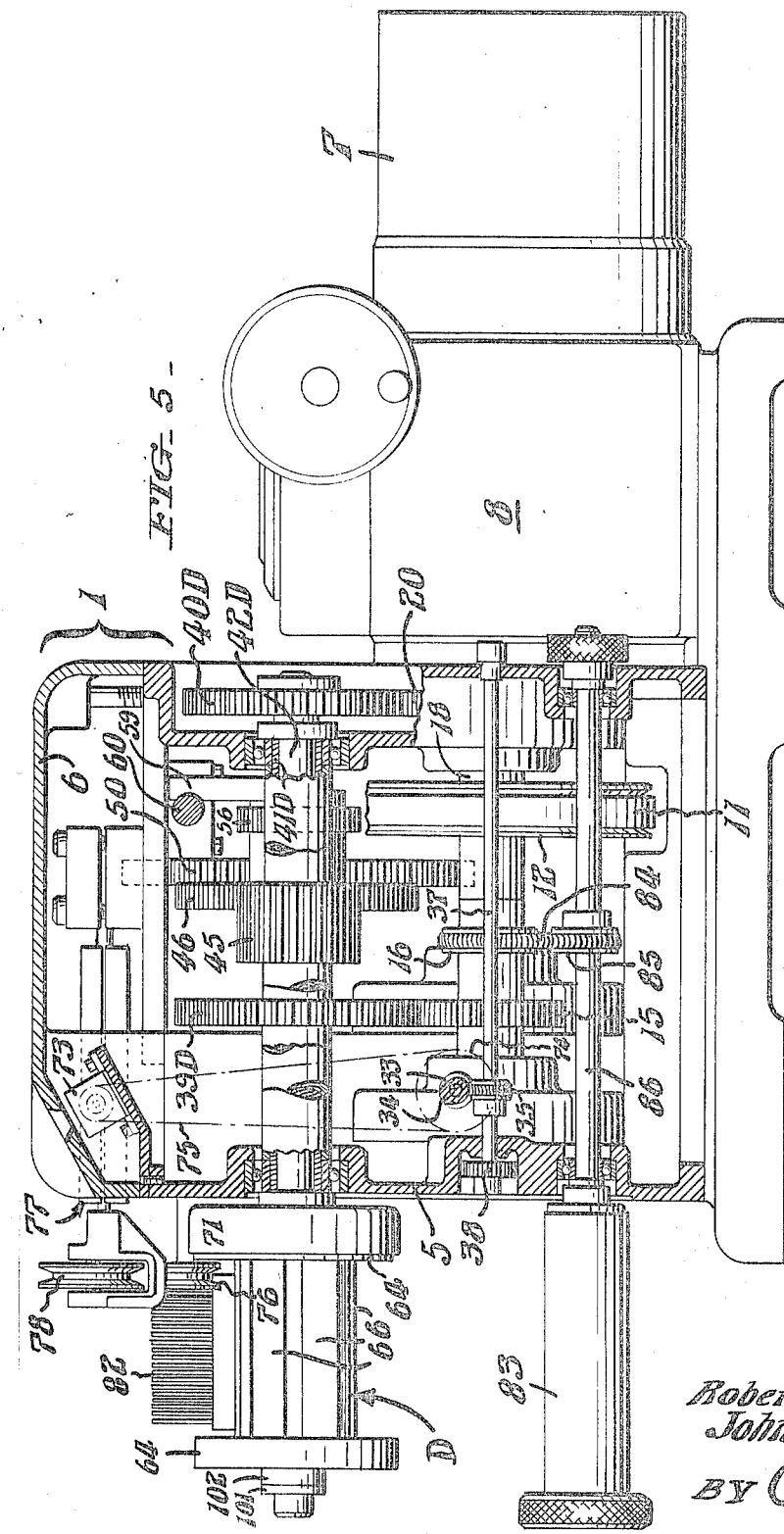

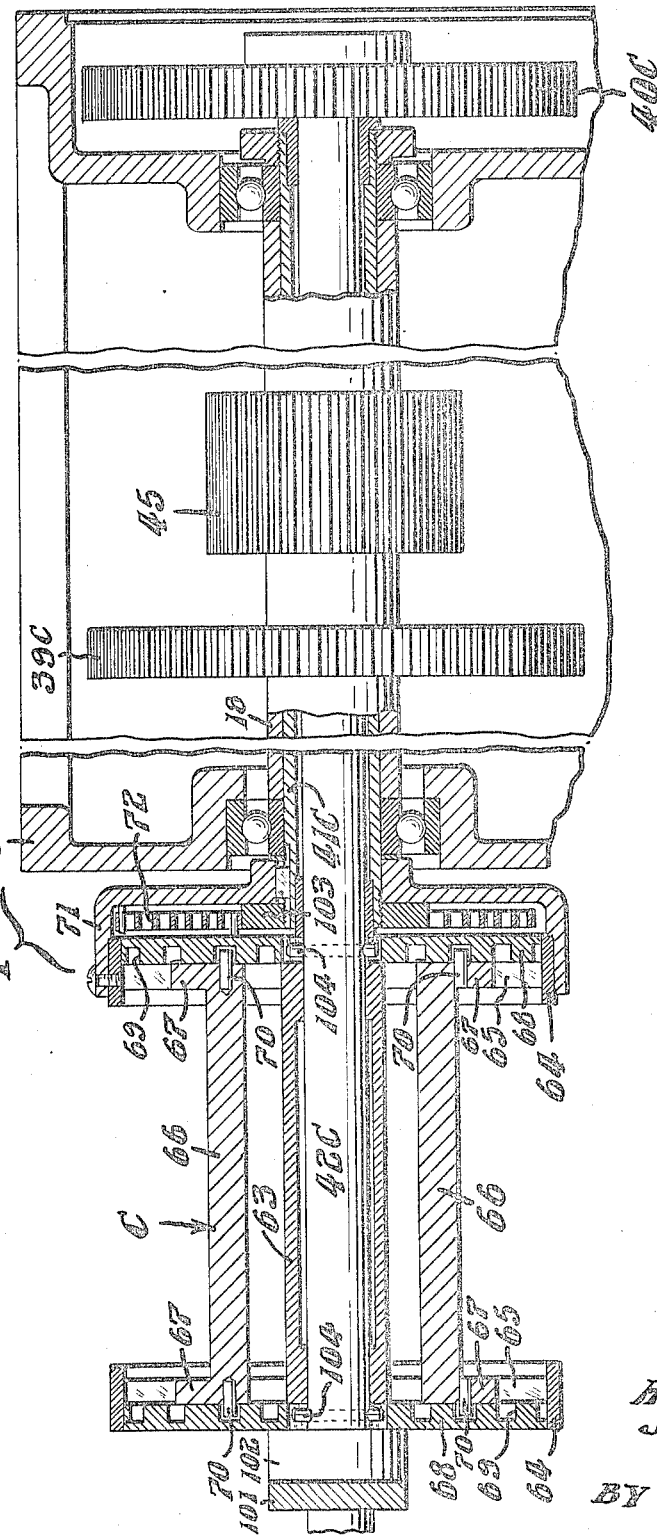

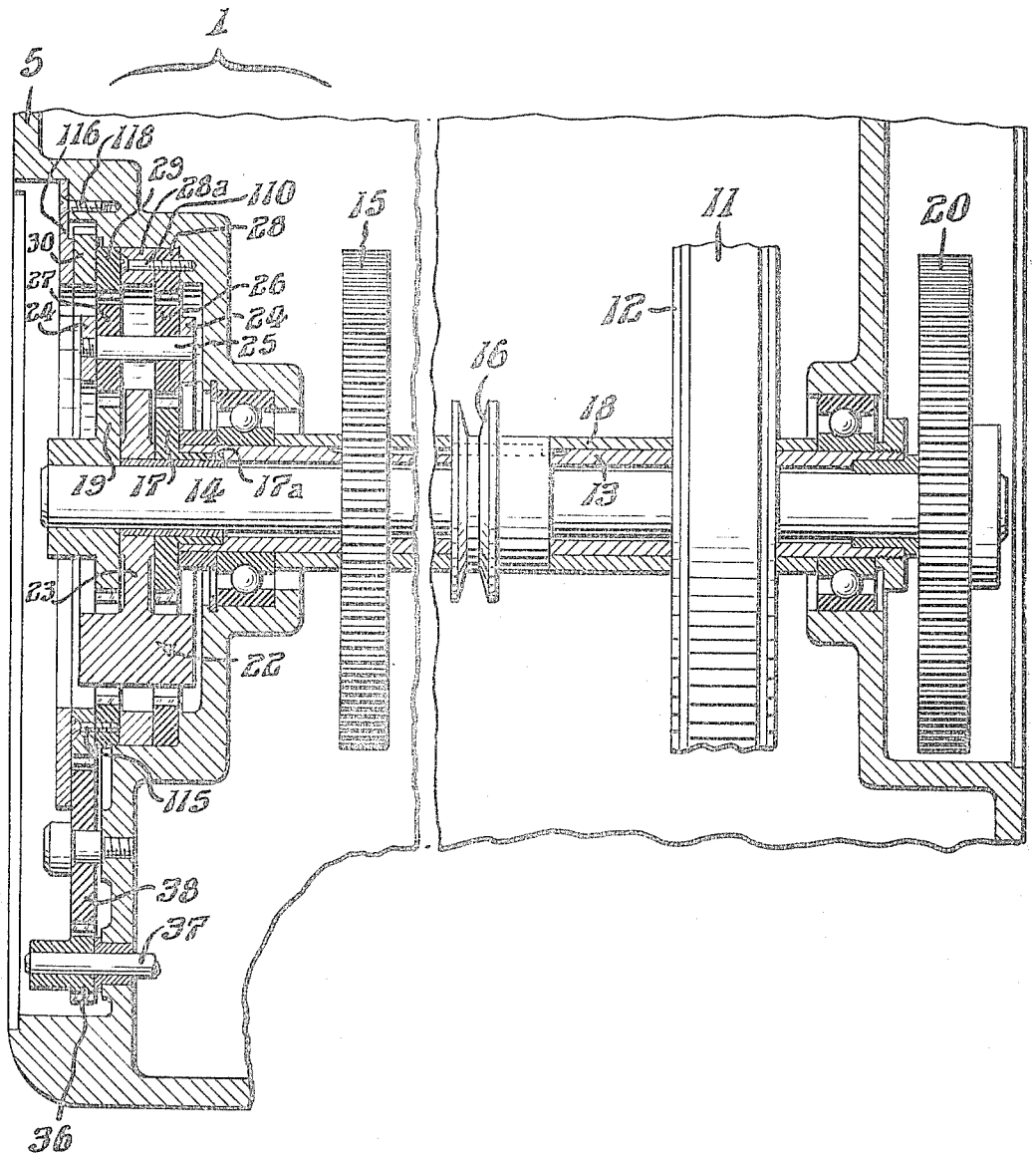

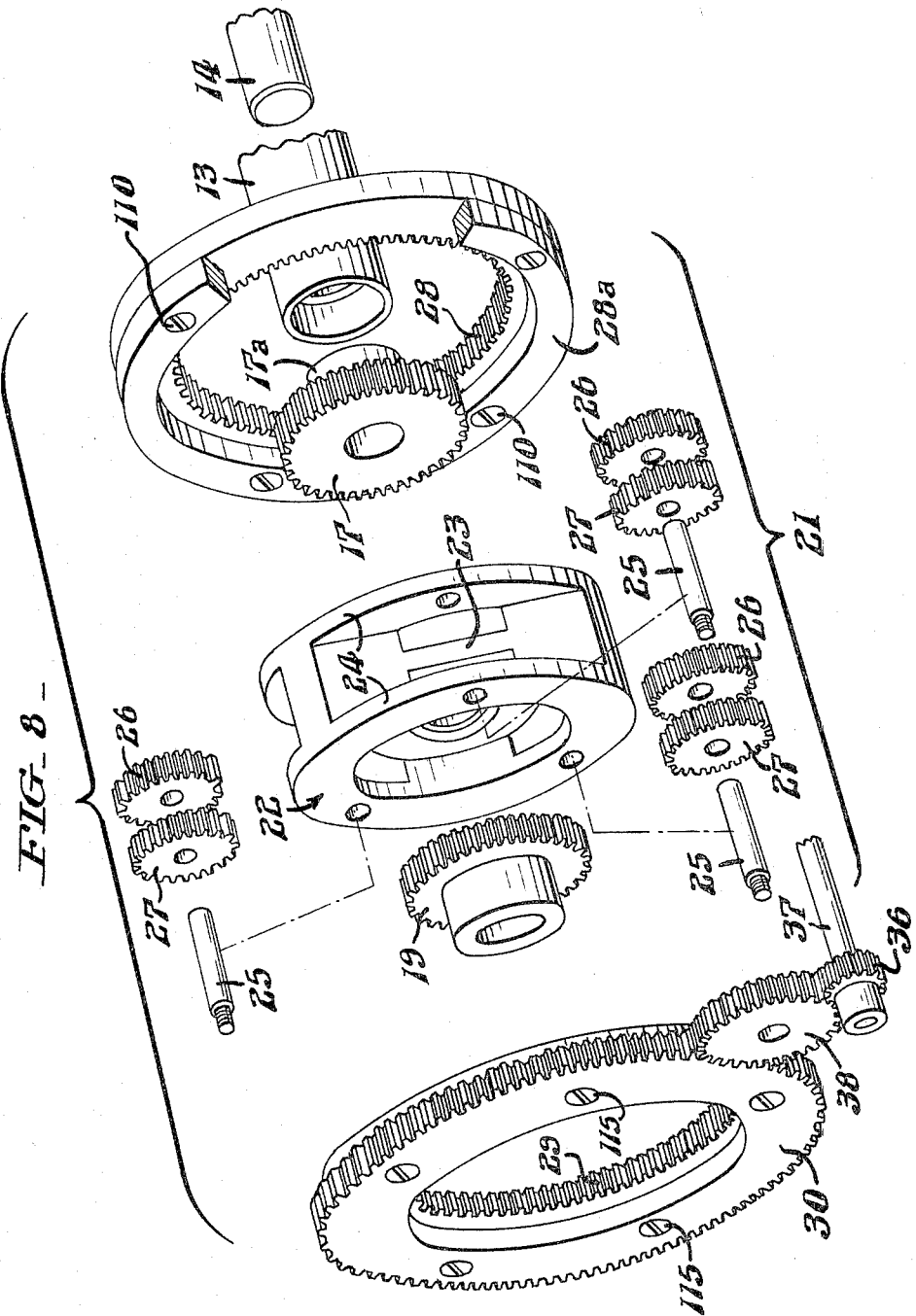

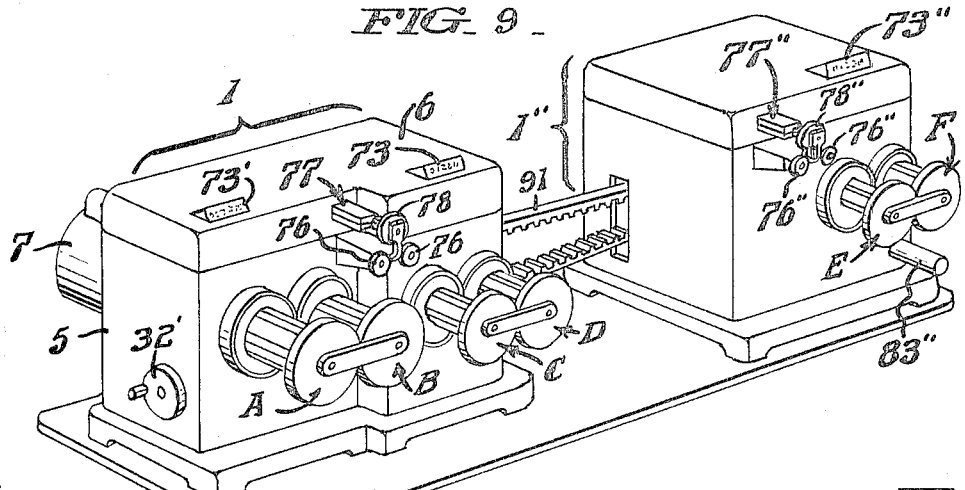
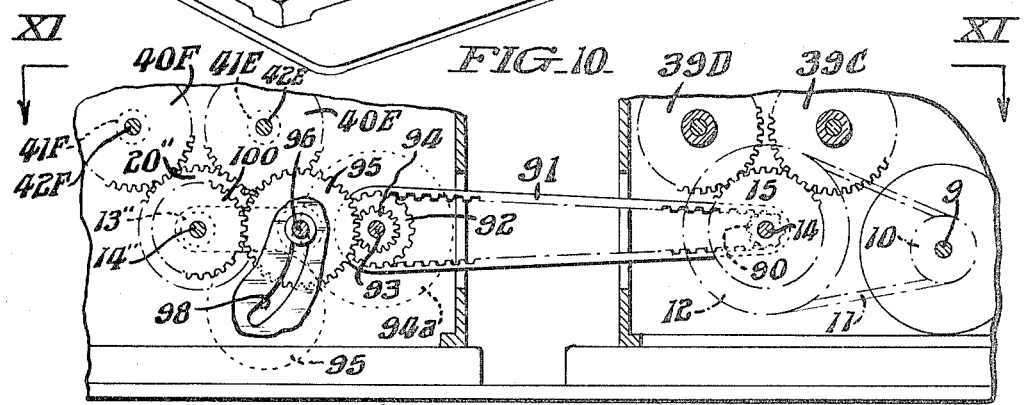
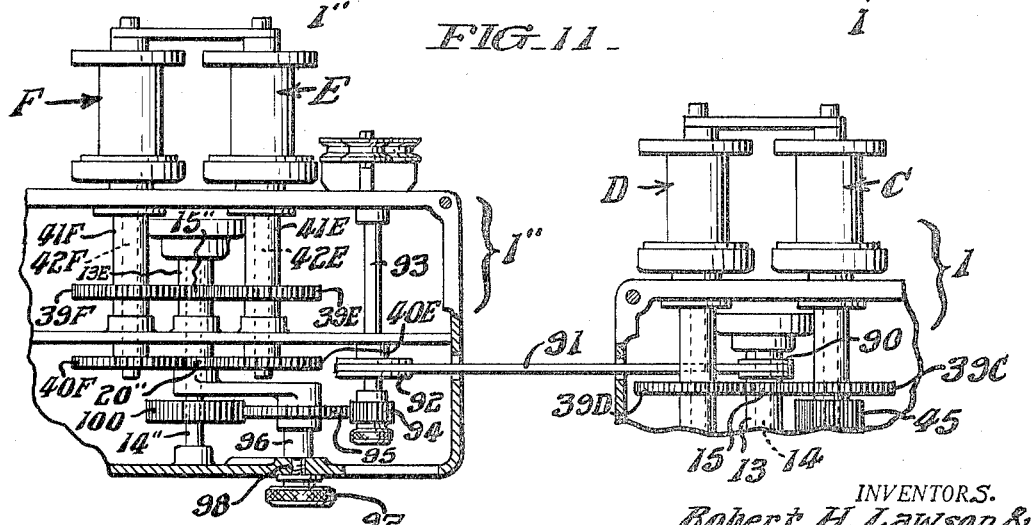

United States Patent Office 3,274,824
Patented Sept. 27, 1966

3,274,824
METHOD AND APPARATUS FOR TENSILE TESTING
Robert H. Lawson, Pawtucket, R.I., and John B. Lawson, Wilbraham, Mass., assignors to Lawson Engineering Co., Pawtucket, R.I., a corporation of Rhode Island
Filed May 21, 1964, Ser. No. 369,124
28 Claims. (Cl. 73—95.5)

This application is a continuation-in-part of our copending U.S. application Serial No. 282,433 filed May 22, 1963, and now abandoned.

This invention relates to apparatus and methods for testing materials, and particularly to improvements in apparatus and methods for testing a strand of material, such as thread or tape, for its characteristic response to being stretched, both while stretch is being imposed and while stretch is being decreased.

In the first part of this specification we shall describe the construction of the form of our apparatus suitable for the development of a truly "dynamic" and "continuous" stress-strain curve, while the second part involves a description of an adaption of our device designed to measure, "dynamically" and "continuously," the hysteresis characteristics of a strand of material.

Very broadly, our invention utilizes expandable and contractable delivery and take-up drums which cooperate to impose stretch selectively on a moving strand. Delivery and take-up drums have been used before, but in prior devices neither the circumference nor the effective peripheral speed of the drums are variable in extremely accurate micrometer-like amounts.

In contrast to the prior art, apparatus constructed according to our invention is capable of increasing—or decreasing—the amount of stretch upon a continuously moving strand of material by virtually infinitismal degrees, which makes it possible to develop a truly continuous stress-strain or hysteresis curve for the strand.

We have said that our apparatus is capable of developing a "dynamic" and "continuous" stress-strain or hysteresis curve. By "dynamic" we mean a measurement taken upon a strand when the strand is moving past the measuring station. By "continuous" we mean that the amount of stretch imposed may be varied (i.e., either increased or decreased) by successive virtually infinitesimally small amounts, whereby a measurement of the strand's stretch characteristics may be obtained for all practical degrees of stretch between selected extremes.

One of the chief drawbacks of prior devices is that they are capable of varying stretch only in relatively large steps or amounts, with the result that no information can be obtained with respect to the response of the material to amounts of stretch between such exremes. Wih our invention, however, it will be observed that one significant advantage is the elimination of such "information gaps" so common with prior devices. Accordingly, the primary object of our invention is to provide method and apparatus operable to vary the stretch upon a moving strand of material by amounts which are, practically speaking, stepless or infiinitesimal amounts, and for giving a truly continuous measurement of stress in successive portions of the strand so that a dynamic stress-strain diagram of a dynamic hysteresis curve may be developed.

As described more fully below, we accomplish the above object by the provision of positively driven, spaced apart spools, wherein said spools are characterized by means for changing their circumferences in micrometer-like accurate amounts either during operation of the machine or while the machine is stopped, whereby it is possible to vary selectively the exact amount of stretch imposed on a moving strand of material passing around each of said spools.

Figure 2:
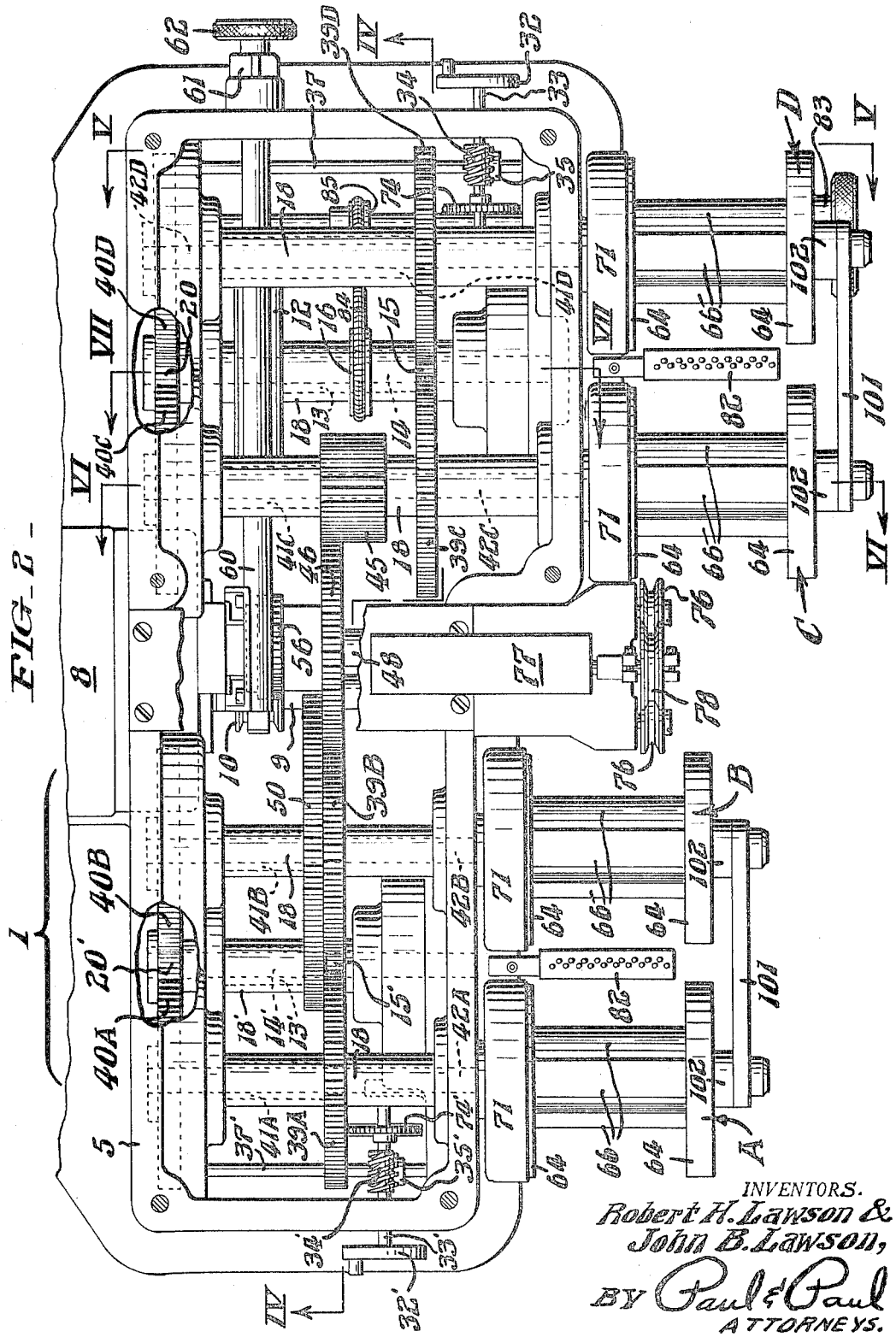
Figure 3:
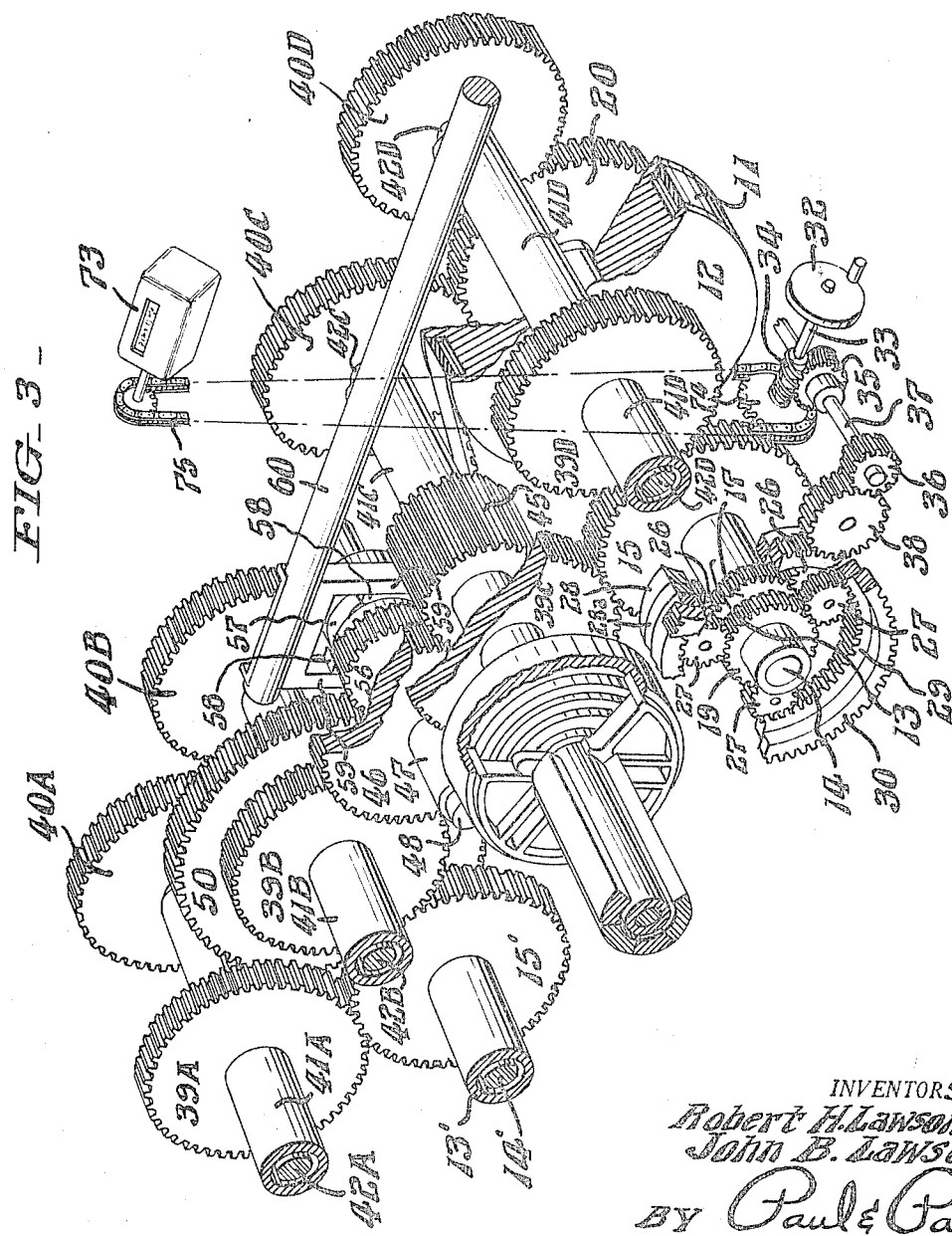

Other objects of the invention will become apparent when the following description is read with reference to the accompanying drawings, in which:

FIGURE 1 is a perspective view of one form of our apparatus;
FIGURE 2 is an enlarged plan view of apparatus shown in FIGURE 1, the cover being removed to expose the interior;
FIGURE 3 is a fragmentary perspective view of parts shown in FIGURE 2;
FIGURE 4 is a vertical section on line IV—IV of FIGURE 2;
FIGURE 5 is a vertical section on line V—V of FIGURE 2;
FIGURE 6 is a fragmentary enlarged section on line VI—VI of FIGURE 2;
FIGURE 7 is a fragmentary enlarged section on line VII—VII of FIGURE 2;
FIGURE 8 is an exploded perspective view of a planetary gear arrangement;
FIGURE 9 is a perspective veiw of a modification of our invention;
FIGURE 10 is an elevational view taken from the rear of the units shown in FIGURE 9 with the rear wall of the casings removed; and
FIGURE 11 is a plan view of the units shown in FIGURE 9 taken along the lines XI—XI of FIGURE 10.

Apparatus constructed in accordance with our invention is generally designated 1 and comprises a casing having a main body part 5 and a top 6. As shown in FIGURE 1, the device is provided with a pair of delivery spools A, B and a pair of take-up spools C, D.

The apparatus is driven by an electric motor 7 via a Graham stepless variable speed transmission 8 (FIG. 5). Power take-off shaft 9 (FIG. 4) of the transmission is fitted with a pulley 10 over which is trained a timing belt 11. Belt 11 is also trained over pulley 12 mounted on rotatable hollow sleeve 13. Also mounted on sleeve 13 is a gear 15 and a pulley 16 (FIG. 7). Tubular spacers 18, inserted over sleeve 13, serve to separate gear 15, pulley 16 and pulley 12.

Rotatably disposed within sleeve 13 is a shaft 14 passing through rotatable sun gear 17. The hub 17a of sun gear 17 is affixed within the end of sleeve 13 so that said gear 17 will turn with said sleeve. Affixed to opposite ends of shaft 14 is a sun gear 19 and a gear 20.

Sun gears 17 and 19 are part of planetary gear arrangement 21 (FIG. 8) which serves to transmit rotation of sleeve 13 to shaft 14. Thus, the planetary arrangement 21 also comprises a cage 22 freely revolvable about shaft 14. The cage has a web 23 and axially spaced flanges 24 having opposing apertures adapted to carry pins 25 which are fixed thereto (FIGS. 7, 8). Each of the three pins 25 carries a planetary gear 26 and a planetary gear 27. Gears 26 mesh with sun gear 17 (attached to sleeve 13), while gears 27 mesh with sun gear 19 (attached to shaft 14).

As shown in FIGS. 7 and 8, a ring gear 28 embraces and meshes with planetary gears 26. A ring spacer 28a is secured to gear 28 by studs 110 that extend into the casing 5. Embracing and meshing with planetary gears 27 is an internal ring gear 29 disposed contiguous to the ring spacer 28a. On the opposite side of ring gear 29 is an external ring gear 30 attached to gear 29 by screws 115. Overlying the outer face of external ring gear 30 is a retainer 116 secured to the casing 5 by screws 118 (FIG. 7).

From the foregoing, it will be seen that rotation of sleeve 13 will cause sun gear 17 to rotate. In turn, rotation of sun gear 17 will cause planetary gears 26 to orbit within stationary ring gear 28. Since planetary gears 26 are carried by pins 25 which are, in turn, carried by cage 22, said cage will rotate. As the cage rotates, planetary gears 27 will be caused to orbit within ring gear 29 and thus turn sun gear 19. Since each gear of the pair of gears 17, 19; 26, 27; 28, 29 is the same size and has the same number of teeth as the other gear of the pair, shaft 14, to which the sun gear 19 is attached, will accordingly be caused to rotate at the same speed as sleeve 13.

It should be noted that while ring gear 29 is stationary in the operation just described, it is possible to turn this gear about its axis which, for purposes to be explained, permits the angular relationship of shaft 14 and sleeve 13 to be changed. The required adjustment of ring gear 29 is accomplished by a corresponding adjustment of ring gear 30, to which gear 29 is attached. Movement of ring gear 30 is, in turn, controlled by a hand wheel 32 (FIG. 3), via shaft 33, worm 34, gears 35 and 36 on shaft 37, and gear 38 meshing with gear 30 (FIGS. 3, 8). Movement of ring gear 29 will cause planetary gears 27 to revolve about pins 25 and, as a result, sun gear 19 will be turned in relation to sun gear 17. Thus, shaft 14 will turn, and the angular relationship between said shaft and sleeve 13 will be changed. It is to be noted that the foregoing adjustment may be accomplished during the operation of the apparatus.

A similar planetary gear arrangement (not shown) with hand wheel 32′ and associated gears is also provided for sleeve 13′ and shaft 14′ (FIGS. 2, 3) and function as above.

Gear 15 on sleeve 13 and gear 20 on shaft 14 drive gears 39D and 40D mounted on sleeve 41D and shaft 42D, respectively (FIG. 3). Since gears 39D, 40D, 15 and 20 have a 1–1 gear ratio, shaft 42D and sleeve 41D will rotate at the same speed. In a similar fashion, gears 15 and 20 also drive, respectively, gear 39C on sleeve 41C and gear 40C on shaft 42C, causing said sleeve and shaft to rotate at the same speed. Thus, shafts 42D and 42C and sleeves 41D and 41C all rotate at the same speed.

As shown in FIGS. 2 and 3, a gear 45 mounted on sleeve 41C meshes with a gear 46 mounted on a sleeve 47, the later being rotatably inserted over stub shaft 48. Also mounted on sleeve 47 is a gear 56.

In the arrangement shown in FIG. 2, gear 46 meshes with gear 39B affixed to gear 50. Both gears 39B and 50 are mounted on sleeve 41B. Gear 39B meshes with gear 15′ affixed to sleeve 13′, and the latter gear meshes with gear 39A affixed to sleeve 41A. Planetary gearing (not shown) similar to gearing 21 functions so that shaft 14′ is driven by, and at the same speed as, sleeve 13′. In turn, gear 20′, which is affixed to shaft 14′, meshes with gears 40A and 40B mounted respectively on shafts 42A and 42B (and serves to drive these latter two shafts at a speed of rotation equal to that of their associated sleeves 41A and 41B.

The ratio of the diameters of gear 46 and gear 39B may be such that the rotational speed of sleeves 41A and 41B and their respective inner shafts 42A and 42B will be one-half of the rotational speed of sleeves 41C and 41D and their respective inner shafts, 42C and 42D. As will be subsequently described in detail, spools A and B (FIG. 2) and driven, respectively, by shaft 42A and sleeve 41A, and by shaft 42B and sleeve 41B. Thus, the rotational speed of spools A and B will be equal to each other, but when gear 46 drives gear 39B (FIG. 2), the rotational speed of these spools will be only one-half that of spools C and D, since the latter spools are driven by shaft 42C and sleeve 41C and by shaft 42D and sleeve 41D respectively.

In this form of our invention it is also possible to change gears so that spools C and D rotate at a different speed ratio with respect to spools A and B. Thus sleeve 47 is provided with a circumferential groove 57 (FIG. 3), diametrically opposite sides of which receive a pair of shoes 58 attached to arms 59. Arms 59 depend from a bar 60 which extends through the casing and is fitted with a lever 61 that terminates in knob 62 (FIG. 2). By manipulation of lever 61 and knob 62, sleeve 47 may be shifted axially, so that while gear 46 remains in mesh with gear 45, it disengages from gear 39B. At the same time, gear 56 engages with gear 50, as shown in FIGURE 3. The ratio of the sizes of gears 50 and 56 in this arrangement may be such that spools A and B make one-sixth as many revolutions per minute as spools C and D.

The over-all speed of operation may be controlled by adjusting the stepless variable speed transmission 8.

From the foregoing, it is apparent that if spools A and B have the same diameter as spools C and D, a strand of material passed around said spools (FIG. 1) may be stretched one hundred or five hundred percent, simply by shifting gears 46 and 56. With our invention, however, it is possible to progressively stretch a strand from zero to eleven hundred percent in virtually stepless increments by means of the uniquely expandable spools, as will now be described.

Since the spools A–D are per se alike only one will be described in detail. Thus, take-up spool C (FIG. 6) comprises a tubular core 63 provided at either end with attached spool heads 64 having angularly spaced radially extending slots 65. Circumferentially spaced about core 63 are a plurality of longitudinally extending segments 66 each provided with opposite end portions 67 slidably received in opposed slots 65 in heads 64. Nested in each head is a disc 68 provided with a groove 69 which spirals outwardly from core 63. (The grooves 69 are complemental, being a mirror image of each other.) Each end portion 67 of each segment 66 carries a pin 70 which extends into the adjacent groove 69.

Spool C is fitted over shaft 42C, at one end of which is a tie bar 101 and a collar 102, adjacent the associated outer disc 68. Threaded over one terminal portion of sleeve 41C is a collar 103, adjacent a flanged cover 71. The inner head 64 of the spool is attached within cover 71 which is, in turn, keyed to sleeve 41C. Accordingly, heads 64 and segments 66 are driven by sleeve 41C. The discs 68 are affixed to shaft 42C by pins 104.

The spools are essentially the same as those disclosed and claimed in our copending U.S. application Serial No. 153,079, filed November 17, 1961, and now abandoned. It is to be noted that spools A, B and D are mounted, respectively, on sleeve 41A and shaft 42A, sleeve 41B and shaft 42B, and sleeve 41D and shaft 42D. Tubular spacers 18 are inserted over the sleeves 41A–D to separate the various elements mounted thereon.

When it is desired to change the effective circumferences of the spools C and D, the hand wheel 32 (FIGS. 2 and 3) is turned which, via the planetary gearing arrangement 21, changes the angular relation between sleeve 13 and shaft 14, as previously described. The change in angular relation is then transmitted through gears 15 and 20 to gears 39C and 40C to change the angular relationship of sleeve 41C and shaft 42C. In a similar fashion, the change in angular relation is transmitted to sleeve 41D and shaft 42D by gears 39D and 40D. As a result, the angular relation between the spool heads 64 and discs 68 of spools C and D is simultaneously changed, and the segments 66 are shifted radially, depending upon the direction in which the hand wheel 32 is turned, to change the circumferences of the spools. A clock-type spring 72, the opposite end portions of which are affixed, respectively, to disc 68 and cover 71, serves to eliminate any backlash which might develop in the gear trains that govern the diameters of the spools. The effective diameters of the spools A and B is changed in the same manner, by manipulating the hand wheel 32′ (FIG. 2).

To facilitate exact settings of the spool circumferences, the device is equipped with counters 73 and 73′ (FIG. 1), each of which is associated with one of the planetary gear arrangements. Thus a sprocket 74 mounted on shaft 33 (FIG. 3) drives a chain 75 trained over the sprocket of counter 73 which may be, for example, a Veeder-Root series 1141 counter. Conveniently, the counters are arranged to indicate spool circumference in one-thousandths of an inch.

As shown in FIGURES 1, 2 and 5, a pair of laterally spaced guide pulleys 76 and a standard strain gauge 77 are mounted on the casing. The gauge may be a Bytrex Load Cell, Model EC10, made by Kulite-Bytrex Corporation, Newtown, Massachusetts. The gauge is provided with a pulley 78.

A recorder 79, which may be a Dynamaster Recorder made by the Bristol Company, Model 1PD 590–35–T113 is used in conjunction with the apparatus already described. Such a recorder is capable of giving a graphic representation of variations in the load imposed on strain gauge 77 and is provided with a vertically moving chart 80 and a horizontally moving scriber 81.

In setting up the device for operation, a strand of material to be tested, such as a thread T, is spiralled a number of times about the pair of spools A, B, being passed between successive pairs of the upright teeth of a comb-like guide 82. The multiple windings prevent slippage of the thread about the spools and the spiralling prevents overlapping of the thread. From the spools A, B the thread is passed under one of the guide pulleys 76, over the strain gauge pulley 78 and then under the other guide pulley 76. Next, the thread is spiralled a number of times about the pair of spools C, D and between the teeth of the guide 82 associated therewith. From the pair of spools C, D the thread is wound about a spindle 83 mounted on shaft 86 (FIG. 5). Shaft 86 is driven by a belt 84 trained over pulley 16 and pulley 85 mounted on shaft 86.

Using the arrangement shown in FIG. 2, i.e., where gears 39B and 46 mesh, take-up spools C, D rotate twice as fast as delivery spools A, B. If it is assumed that the minimum circumference of the spools is four inches and the maximum eight inches, appropriate adjustment of the hand wheels 32 and 32' will provide from zero up to three hundred percent stretch, inclusive. For example, if take-up spools C, D are given a four inch circumference and delivery spools A, B an eight incch circumference, the effective peripheral speeds of the spools will be the same. Thus, the degree of stretch will be zero. By way of further example, if spools C, D are set at a 4.2 inch circumference and spools A, B are set at an 8.0 inch circumference, spools C, D are pulling 8.4 inches of thread T for every eight inches delivered by spools A, B. Thus, the thread T is stretched five percent between the pairs of spools. Gears 39B and 46 are used with inelastic yarns.

If the thread T is uniform, the recorder 79 will give a steady reading, i.e., a generally straight line will be drawn on the chart 80, as for example, at 87. If a portion of the thread is not uniform, for example, due to change of size, twist or set, or for any other reason, irregularities will appear in the line as at 88, for example. Variations in nylon thread, which cause horizontal streaks in stockings, may be thus detected, as well as variations in twist that occur during ring spinning. Apparatus constructed in accordance with the invention will detect variations in both so-called inelastic threads and elastic threads. It will also determine the maximum tension or stretch under which the thread may be safely used.

Knob 62 may be manipulated to shift gear 46 out of engagement with gear 39B, and to shift gear 56 into engagement with gear 50. This arrangement is useful with elastic yarns. Spools C and D will now make six times as many revolutions per minute as spools A and B. Since spools A and B may be adjusted to eight inches circumference, and spools C and D to four incches circumference, twenty-four inches of yarn may be pulled from the pair of spools A, B for every eight inches delivered. In other words, the thread is stretched two hundred percent. If, instead, spools C and D are adjusted to eight inches circumference and spools A and B to four inches circumference, forty-eight inches of thread are pulled from spools A, B for every four inches delivered. The thread would then be stretched eleven hundred percent.

As explained, the circumferences of the spools A, B and C, D may be adjusted to precisely select a desired amount of stretch to be imposed on a moving strand of material. It will be observed, moreover, that our invention also makes it possible to progressively vary the stretch imposed by practically stepless increments. As a result, the response of a given strand may be obtained for virtually all degrees of stretch between selected extremes so that a truly continuous stress-strain curve graphically is developed.

A tachometer may be applied to spools A and B in a manner to indicate the length of the strand tested for a given length of the chart.

In FIGURES 9 and 10, 11 there is shown the adaptation of our device which makes it possible to obtain a dynamic and continuous measurement of the hysteresis characteristics of a strand.

In general, the adaption consists of the addition of a second tester unit 1'', to the tester unit 1 previously described. Tester 1 is modified by the provision of a sprocket 90 affixed to sleeve 13 in front of gear 15. As shown in FIG. 10, a cog belt 91 is trained around sprocket 90 and a sprocket 92 affixed to a shaft 93 of unit 1''. Thus, spools E and F of the latter unit will be positively driven by the first unit.

Spools E and F are constructed like spools A, B, C and D, and the unit 1'' also includes planetary gearing (not shown) whereby the diameter of spools E and F may be accurately varied. Driven shaft 93 carries a gear 94 which meshes with a gear 95 on arm 96. Gear 95 drives gear 100 on shaft 14''. As indicated in FIG. 10, gear 95 may be moved away from shaft 93 by loosening knob 97 and sliding arm 96 in arcuate guide 98. Thus, if desired, a larger gear, such as 94a (FIG. 10), may be substituted for gear 94. Gear 94 is keyed to shaft 93 in a manner normal for change gears. As shown, gear 94 is half the diameter of gear 100, while gear 94a is twice the diameter of gear 100. Of course, gear 94 may be any size between these extremes since guide 98 is designed so that gears 95 and 100 are always in mesh.

Shaft 14'' on which gear 100 is mounted is disposed within sleeve 13''. The shaft 14'' and sleeve 13'' correspond in construction to shafts 14, 14' and sleeve 13, 13' of tester unit 1, and through a similar planetary gearing arrangement (not shown) the rotation of shaft 14'' is transmitted to rotate sleeve 13''. As in the case of unit 1, shaft 14'' carries a gear 20'' which drives gears 40E and 40F mounted on shaft 42E and 42F of spools E and F. In a similar fashion, gear 15'' on sleeve 13'' drives gears 39E and 39F mounted on sleeves 41E and 41F of spools E and F. Spools E and F are therefore driven by the same type of gearing as are the spools of the tester unit 1. It is to be noted that by the use of a hand wheel (not shown) associated with the planetary gearing (not shown) for spools E and F, the diameters of these spools may be varied as desired. The circumferences of spools E and F are indicated by a counter 73''.

Tester unit 1'' is equipped with strain gauge 77'' mounted between the take-up spools C and D and spools E and F. A recorder (not shown) is connected to gauge 77''.

It is desirable that the spools E and F be capable of peripheral speeds equal to the maximum attained by take-up spools C and D and the minimum of delivery spools A and B as well as all intermediate speeds. Thus, hysteresis loss can be measured from a zero amount of relaxation (i.e. where spools E and F have the peripheral speed of spools C and D), to the point of maximum relaxation where spools E and F have the peripheral speed of spools A and B. Assuming all spools can be contracted to a four inch circumference or expanded to an eight inch circumference, and if motor 7 of unit 1 imparts 6 r.p.m. to spools C and D, these spools will be capable of surface speeds of from 24″ to 48″ per minute. Depending on whether the 2-1 (FIG. 2) or the 6-1 (FIG. 3) gear ratio is used, spools A and B will be capable of a minimum surface speed of 4″ per minute (i.p.m.) and a maximum of 24 i.p.m. Accordingly, spools E and F should have the capability of matching all peripheral speeds between the range of 4 i.p.m. and 48 i.p.m. Assuming cog wheel 92 to be twice the diameter of cog wheel 90, this range could be covered by the following ratios between the diameters of gear 94 and gear 100: (1) 1/3, (2) 2/3, (3) 1/1, (4) 1⅓, (5) 2/1. The corresponding range peripheral speeds of spools E and F would be: (1) 4-8 i.p.m., (2) 8-16 i.p.m., (3) 12-24 i.p.m., (4) 16-32 i.p.m., (5) 24-48 i.p.m. Thus, simply by substituting different size gears 94, the tester unit 1″ can achieve the necessary range of from 4-48 i.p.m. It is evident that other gearing may be used to cover this range, or whatever range which would be necessary to compensate for other gear ratios between spools C, D and A, B of the main tester unit.

In operation, a strand of materials stretched between spools A, B and C, D will pass from the latter spools under pulley 76″ of the unit 1″, and thence over pulley 78″ at the end of strain gauge 77″ under pulley 76″ and around spindles E and F. Finally, the strand is taken up by a spindle (not shown), which is driven by sleeve 13″ by a belt and pulley system (not shown) similar to that for spindle 83 of tester unit 1. The amount of relaxation of stretch upon the strand will, of course, be determined by a selected ratio between the peripheral speeds of spools C, D and spools E and F.

By stretching a moving strand of material between spools A, B and C, D and relaxing it between the latter spools and spools E and F while recording the power needed to stretch it in the first instance and the power needed to prevent it from completely relaxing in the second instance, it is possible to develop truly accurate stress-strain and hysteresis curves for a given strand of material.

A recorder having multiple pens, each of which is responsive to one of the two strain gauges, can be used to provide graphic representation of stress-strain and hysteresis characteristics on a single chart.

The speed of the strand may be determined accurately by using a tachometer on spools A, B. Since the circumference of the spools is indicated by the counter 73′, the peripheral speed of spools A, B may easily be computed. Since all of the spools are driven from one source and are geared together, it is also possible to compute the surface spaced of all of the spools by using the circumference measurement provided by the counters associated with such spools.

It will be evident that additional units such as 1″ may be added and driven by each preceding unit. In this manner a strand may be alternately stretched and relaxed as many times as required. It will also be evident that the strand may initially be drawn from its source of supply by an auxiliary apparatus and placed under a stress to stretch it. It can then be passed from this zone into another zone where it can be relaxed, and this process may be repeated as many times as desired to exercise the material before passing it through units such as 1 and 1″. If desired, other combinations of steps may be used, such as stretching a strand one amount in the first unit and then increasing the stretch by predetermined amounts in successive units. In similar fashion, the stretch on the strand may be progressively relaxed between several units.

It is to be clearly understood that the terms and expressions used herein are employed as terms of description, and not of limitation, and that there is no intention in using such terms and expressions to exclude any equivalents of the apparatus or method described. It is also to be clearly understood that what is specifically shown and described herein represents a preferred embodiment only of the invention, and that various changes and equivalents may be resorted ot without departing from the principles of the invention or the scope of the claims hereof. Accordingly, it is intended to claim the present invention broadly, as well as specifically, as indicated in the appended claims.

What is claimed is:

1. In apparatus for testing strands of material, the combination comprising revolvable means for delivering a strand of material, revolvable take-up means coacting with said delivery means for stretching said strand and operable to take up said strand as it is delivered, the effective girth of at least one of said revolvable means being expansible and contractible, said delivery and take-up means being operative to prevent said strand from slipping under the influence of the stretching effort, means for varying the effective girth of said variable girth revolvable means so as to selectively vary the degree of stretch while the strand is being advanced from said delivery to said take-up means, and means for sensing and obtaining an indication of the effect of the stretching effort upon said strand.

2. Apparatus as defined in claim 1 wherein the revolvable take-up means is expansible and contractible in effective girth.

3. Apparatus as defined in claim 2 wherein the revolvable take-up means includes a pair of spools each of which is expansible and contractible in effective girth.

4. Apparatus as defined in claim 1 wherein the revolvable delivery and take-up means each includes a pair of spools each variable in effective girth.

5. In apparatus for testing strands of material, the combination comprising means for progressively passing a strand of material along including a first pair of spools for delivering said strand, a second pair of spools coacting with said first pair of spools for applying a stretching effort to said strand and operable for taking said strand up as it is delivered, gear means operatively interposed between said spools for actuation of said first pair of spools and said second pair of spools simultaneously in predetermined timed relation, said spools being operative for holding said strand against tendency to slip under the influence of said stretching effort, one pair of said spools being expansible for selectively varying the degree of stretch, and means for sensing and obtaining an indication of the effect of the stretching effort upon said strand.

6. The apparatus defined in claim 5 further including a third pair of spools coacting with said second pair of spools for taking up said strand from said second pair of spools, means for revolving the third pair of spools, the effective girth of said third pair of spools being expansible and contractible while revolving, means for varying the effective girth of said third pair of spools to selectively apply stretching efforts to the strand including stretching efforts of selectively different magnitudes than the stretching effort applied to the strand as it passes from said first to said second pairs of spools, and means for sensing and obtaining an indication of the effect of the stretching effort upon said strand during its passage from said second to said third pairs of spools.

7. The apparatus defined in claim 6 wherein the effective girth of said third pair of spools can be varied to apply stretching efforts of selectively lesser magnitudes to the strand than the stretching efforts applied to the strand as it passes from said first to said second pairs of spools.

8. Apparatus as defined in claim 5 wherein each spool of the second pair thereof is expansible, and said gear means includes a planetary gear arrangement operable for changing the effective girths of said expansible spools.

9. Apparatus as defined in claim 8 wherein said planetary gear arrangement is operable for simultaneously changing the effective girths of said expansible spools to the same degree.

9

10. Apparatus as defined in claim 9 wherein said expansible spools are the same in effective girth and said planetary gear arrangement is operable for simultaneously increasing the girths of said expansible spools to the same degree while the apparatus is in operation.

11. Apparatus as defined in claim 5 wherein the gear means includes shiftable members operable for selectively changing the speed of operation of the first pair of spools relative to the speed of operation of the second pair of spools.

12. In apparatus for testing strands of material, the combination comprising means for progressively passing a strand of material along including a first pair of spools for delivering said strand, a second pair of spools coacting with said first pair of spools for applying a stretching effort to said strand and operable for taking said strand up as it is delivered, gear means operatively interposed between said spools for actuation of said first pair of spools and said second pair of spools simultaneously in predetermined timed relation, said spools being operative for holding said strand against tendency to slip under the influence of said stretching effort, each spool of said second pair thereof being expansible for selectively varying the degree of stretch, a planetary gear arrangement operable for increasing the effective girths of said expansible spools, means for automatically indicating the effective sizes of said spools, and means for sensing and obtaining an indication of the effect of the stretching effort upon said strand.

13. In apparatus for testing strands of material, the combination comprising means for progressively passing a strand of material along including a first pair of spools for delivering said strand, a second pair of spools coacting with said first pair of spools for applying a stretching effort to said strand and operable for taking said strand up as it is delivered, gear means operatively interposed between said spools for actuation of said first pair of spools and said second pair of spools simultaneously in predetermined timed relation, said spools being operative for holding said strand against tendency to slip under the influence of said stretching effort, one pair of said spools being expansible, said expansible spools each including parts shiftable relative to one another about the axis of the spool, and circumferentially spaced longitudinally extending elements carried by said parts and mounted for radial shifting movement, and said gear means including means for turning said parts in unison and operable while the apparatus is in operation for shifting said parts and elements as aforesaid thereby to selectively vary the effective girth of the spool, and means for sensing and obtaining an indication of the effect of the stretching effort upon said strand.

14. In apparatus for testing strands of material, the combination comprising means for progressively passing a strand of material along including a first pair of spools for delivering said strand, a second pair of spools coacting with said first pair of spools for applying a stretching effort to said strand and operable for taking said strand up as it is delivered, gear means operatively interposed between said spools for positively revolving said first pair of spools and said second pair of spools in the same direction at preselected speeds, said spools being operative for holding said strand against tendency to slip under the influence of said stretching effort, said second pair of spools being expansible and each including parts shiftable relative to one another about the axis of the spool and yieldably biased against such shifting, and circumferentially spaced longitudinally extending elements carried by said parts and mounted for radial shifting movement, and said gear means including means for turning said parts in unison and operable while the apparatus is in operation for shifting said parts against the influence of said bias and for shifting said elements as aforesaid thereby to selectively vary the effective girth of the spool, and means for sensing and obtaining an indication of the effect of the stretching effort upon said strand.

15. In apparatus for testing strands of material, the combination comprising a first pair of spools for delivering said strand, a second pair of spools for taking up said strand as it is delivered, each of said spools including parts shiftable relative to one another about the axis of the spool and yieldably biased against such shifting, and circumferentially spaced longitudinally extending elements carried by said parts and mounted for radial shifting movement in response to shifting of said parts against the influence of said bias, a gear train operatively interconnecting all of said parts for turning said first pair of spools at the same effective rate of speed, the second pair of spools at the same effective rate of speed, and all of said spools in the same direction in predetermined timed relation including a planetary gear arrangement for each pair of spools manually operable independently while the apparatus is in operation to shift the spool parts against the influence of said bias and the spool elements radially as aforesaid thereby to selectively vary the effective girths of the spools, means for automatically indicating the effective sizes of said spools, gears selectively interposed in said gear train for changing the relative effective rates of speed of said pairs of spools, and means for automatically sensing and obtaining an indication of the effect of the stretching effort upon said strand.

16. In apparatus for testing strands of material, the combination comprising a pair of spool means adapted for having a strand of material spirally wound about one and then about the other, means positively gearing said pair of spool means together for turning the same in the same direction and progressively passing said strand along, and mechanical means operable for accurately expanding and contracting at least one of the spool means to thereby vary the effective circumference of said spool means while said strand is being advanced whereby said strand may be stretched an exact amount and the stretch accurately varied as the strand advances.

17. In apparatus for testing strands of material, the combination comprising a plurality of spools about which a strand of material may be spirally wound, at least one of said spools including a circumference about which said strand is wound comprising a plurality of circumferentially arranged radially movable elements, said spools being operable for progressively stretching said strand therebetween as it is passed along thereby, and mechanical means operable for varying the effective circumference of at least one of said spools as the strand advances by moving said radially movable elements.

18. In apparatus for testing strands of material, the combination comprising positively interconnected diametrically expansible revolvable spools operable for advancing a strand of material at a constant rate of speed, and mechanical means operable for accurately expanding the diameter of at least one of said spools.

19. A method of testing strands of materials including the steps of:
 (a) passing a strand of material through a stretch zone,
 (b) applying a stretching effort to stretch successive portions of the strand as they pass through said stretch zone,
 (c) while measuring the stress in each of said successive portions of the strand,
 (d) passing the strand through a relaxation zone, and
 (e) applying a stretching effort of less magnitude than the stretching effort applied in said stretch zone to successive portions of the strand as they pass through said relaxation zone,
 (f) while measuring the stress in each of said successive portions of the strand,
 (g) whereby the hysteresis characteristics of said strand may be determined by a comparison of said measurements.

20. The method of claim 19 wherein the stretching effort applied in the stretch zone is uniform.

21. The method of claim 19 wherein the stretching effort applied in the relaxation zone is uniform.

22. The method of claim 19 wherein the stretching effort applied in the stretch zone is varied.

23. The method of claim 19 wherein the stretching effort applied in the relaxation zone is varied.

24. A method of testing strands of material including the steps of:
   (a) passing a strand of material through a first stretch zone,
   (b) applying a stretching effort to stretch successive portions of the strand as they pass through said first zone,
   (c) then passing the strand through at least a second stretch zone,
   (d) applying a stretching effort to stretch successive portions of the strand as they pass through said second zone,
   (e) varying at least one of said stretching efforts as the strand is moving through said first and said second zones, and
   (f) measuring the stress in said strand in said first and said second zones as the strand passes therethrough.

25. The method of claim 24 wherein the stretching effort applied to the moving strand in the first zone is, during a given time interval, increased in magnitude while, during the same time interval, the stretching effort applied in the second zone is decreased in magnitude, whereby the hysteresis characteristics of said strand may be determined by a comparison of said stress measurements.

26. The method of claim 24 wherein the stretching effort applied in the first stretch zone is, at least during one time interval, lesser in magnitude than the stretching effort applied in the second stretch zone during the same time interval.

27. The method of claim 24 wherein the stretching effort applied in the first stretch zone is varied during a given time interval and wherein the stretching effort applied in the second stretch zone is maintained constant during such time interval.

28. The method of claim 24 wherein the stretching effort applied in the first stretch zone is maintained constant during a given time interval and wherein the stretching effort applied in the second stretch zone is varied during such time interval.

References Cited by the Examiner

UNITED STATES PATENTS

| | | | |
|---|---|---|---|
| 2,302,792 | 11/1942 | Moritz | 28—71.3 X |
| 2,634,607 | 4/1953 | Lawson | 73—160 |
| 2,736,944 | 3/1956 | Herbert et al. | 28—59.5 |
| 3,018,659 | 1/1962 | Brown | 73—95.5 |
| 3,183,711 | 5/1965 | Duncan | 73—95.5 X |

FOREIGN PATENTS 783,830   10/1957   Great Britain.

RICHARD C. QUEISSER, *Primary Examiner.*

G. M. GRON, *Assistant Examiner.*